HIGH SPEED MEMORY

Filed Oct. 2, 1962 3 Sheets-Sheet 1

INVENTOR.
ERIC W. MOULTON
BY Alden D. Redfield
Charles M. Hogan
ATTORNEYS.

Nov. 22, 1966 E. W. MOULTON 3,287,709

HIGH SPEED MEMORY

Filed Oct. 2, 1962 3 Sheets-Sheet 2

INVENTOR.
ERIC W. MOULTON
BY Alden D. Redfield
Charles M. Hogan
ATTORNEYS.

Nov. 22, 1966 E. W. MOULTON 3,287,709

HIGH SPEED MEMORY

Filed Oct. 2, 1962 3 Sheets-Sheet 3

INVENTOR.
ERIC W. MOULTON
BY Alden D. Redfield
Charles M. Hogan
ATTORNEYS.

United States Patent Office 3,287,709
Patented Nov. 22, 1966

3,287,709
HIGH SPEED MEMORY
Eric W. Moulton, Malibu, Calif., assignor to Avco Corporation, Cincinnati, Ohio, a corporation of Delaware
Filed Oct. 2, 1962, Ser. No. 227,919
3 Claims. (Cl. 340—174)

The present invention relates to information storage devices of the inertialess type.

A primary object of the invention is to provide a fast access memory which utilizes electron gun techniques for writing in and reading out information.

Another object of the invention is to provide a storage tube memory which is not only characterized by the fast-access time of electron gun-scanned devices, but also posseses the following advantages:

(1) Low cost of original equipment per datum;
(2) Freedom from necessity of regeneration;
(3) Simplified control and data supply circuitry;
(4) Nonvolatility of the storage technique;
(5) Rapid access time;
(6) Nondestructive read-out;
(7) Extremely high resolution and packing density.

It is also an object of the present invention to provide a high speed memory comprising means for data storage and information in which electron beams react with sensitive binary elements, through an intensity modulation process, both for recording and reading the information. Data supplied are employed to modulate a "write" electron beam, which stores the information by scanning a pattern of binary elements. Intelligence is delivered by sensing the influence of said binary elements on a "read" electron beam as the beam sweeps past said elements in a scanning process.

Another object of the invention is to provide a storage memory in which the binary element size may be microscopic.

For a better understanding of the present invention, together with other and further objects, advantages, and capabilities thereof, reference is made to the following description of the appended drawings, in which.

Figure 1:
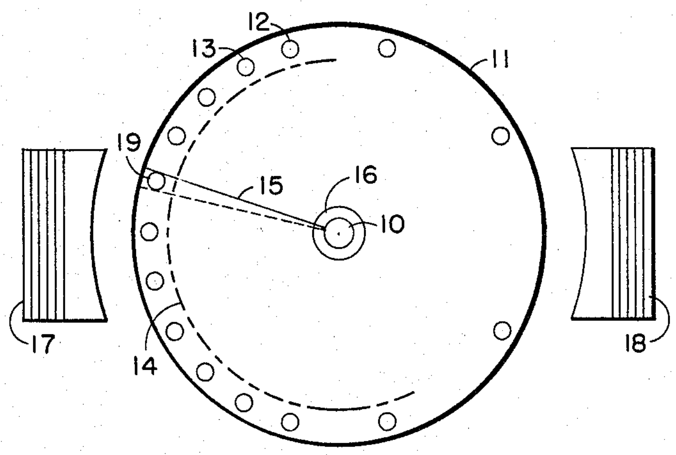
FIG. 1 is a schematic diagram of a single-gun form of high speed memory in accordance with the invention.

Referring now specifically to FIG. 1, there is shown an axial hot cathode 10 concentrically located within a cylindrical anode 11. Disposed within and arranged around the periphery of the anode 11 are ferrite rods 12, 13, etc. Located concentrically inwardly with respect to these ferrite rods is a wire mesh 14, suitably perforated to guide the electronic beam 15. Disposed in proximity and in concentric relationship to the cathode 10 is a modulating grid 16.

The principle of the FIG. 1 embodiment is now described. The ferrite rods 12, 13, etc., are essentially magnetic cores, each having a "square loop" hysteresis curve. The electron beam 15 is capable of magnetizing the designated ones of these cores, to cause them to saturate. That is to say, assuming an electron gun to be instantaneously so oriented as to aim along the upper side of rod 19, and further assuming that the modulating grid is gated to pass a pulse of beam current, then the core 19 is saturated or caused to change its magnetic state. When the influence of the beam is removed, the storage of a binary 1, for example, is indicated by the remanent state of those cores which have been magnetized in this manner.

The electron beam is caused to sweep over an array of magnetic cores or particles while the information in the form of pulses is being written thereon, in a manner analogous to the scanning of a television picture tube raster, with the difference that only selected, discrete cores or particles are changed as to magnetic state. The elements 17 and 18 in FIG. 1 designate appropriate elements for focusing and deflecting the beam. It will be observed that, during the writing operation just described, the electron beam was on the upper side of core 19. Now, the information is read out by passing the beam adjacent the lower side of core 19, for example, so far as the bit stored in that element is concerned. Just as coded information furnished to the modulating grid 16 causes bits to be stored on the matrix of the ferrite rods, so the sensing of electron beam current in an anode load reistor or the like constitutes the read-out of the desired information.

Now, the present invention is characterized by nondestructive read-out because it is not necessary for the read current in the beam and in the anode load to have sufficient amplitude to saturate the cores in the reverse direction.

Reiterating, the operation of the FIG. 1 device is as follows:

By pulsing the modulating electrode on grid 16 close to the cathode structure 10, a pulse of electronic beam current is caused to pass through or adjacent to the core or rod 19 of saturable magnetic material, and to change the magnetic state of said core. This is accomplished by "gating" said grid 16 or other intensity modulating electrode within the tube.

The electron beam is caused to sweep over the array of magnetic cores or particles while information in the form of pulses is being written thereon.

The information is read out by passing the current along the opposite side of the magnetic element, such as 19, and resulting change in electron beam current is caused to operate a sensing device such as an anode load resistor or the like, just as an image orthicon reads the picture information as a pattern of changes on the image surface. Such a read current would not have sufficient amplitude to saturate cores in the reverse direction, but it would merely detect which cores or magnetic elements had been previously saturated.

The mesh 14 can also act as an electrode used during the read-out process, the electron beam completing the circuit to anode 11.

Thus it will be seen that the invention provides a high speed memory device comprising, in combination: a magnetic matrix (12, 13, etc.) having discrete saturable portions or elements; electron beam-providing means (10, etc.), the beam-providing means and scansion means being enclosed in an evacuated envelope; means 16 for modulating an electron beam to write onto the matrix; and means (such as an anode resistor) for demodulating an electron beam to read out of the matrix.

A variation of the FIG. 1 device could be provided by spraying the inside surface of the anode 11 with magnetic oxide particles in such a way as to obtain effectively microscopic cores.

Thus the cores or particles 32 could vary in size down to a molecular film, such as may be obtained by vacuum sputtering and evaporation techniques. Considering the cores as the finely-dispersed particles of a thin magnetic film, the state of the art shows that a very fast turnover period is obtained in switching the magnetic polarity, when used as a conventional wired array. This invention is intended to include such films or microscopic cores within the meaning of "matrix."

It will be understood that the cores or rods 12, 13, etc., may be very short, so that a multiplicity thereof may be extended axially down within the cylindrical anode 11 to provide a large storage capacity in terms of lines and columns.

Figures 2, 3, 4:
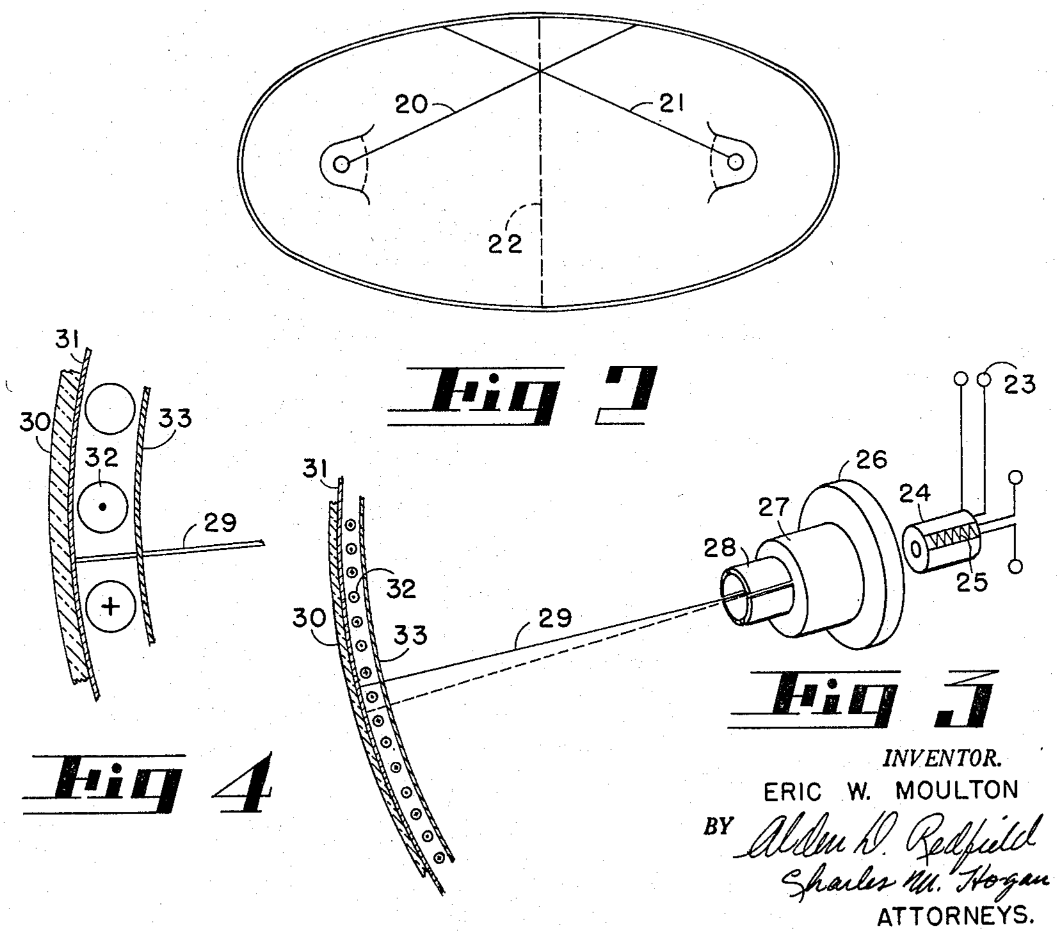
FIG. 2 is a schematic diagram of another form of memory in accordance with the invention, incorporating two electron guns.
FIG. 3 shows an electron gun and screen arrangement illustrative of a preferred embodiment of the invention.
FIG. 4 is an exploded view of the screen and associated elements of FIG. 3.

There is illustrated in FIG. 2 an alternative arrangement in which a beam 20 is suitably modulated for writing and a cross-fire beam 21 is modulated for reading, these two beams passing in opposite directions through a matrix 22 of toroidal magnetic cores. It will be understood that this matrix could also consist of perforated ferrite or magnetic oxide, suitably reinforced.

It will be seen from the foregoing that that which is provided by the invention is the combination of binary storage devices and electron gun means providing beams modulated to write into the storage devices and demodulated to read out of the storage devices. Now, the controlling of a cathode ray beam in such manner as to write in line-by-line page fashion or to read by fast random access is well known to those skilled in the art, and yet the thought of non-destructive read-out by the demodulation of an electron beam sensing the state of a magnetic binary element has heretofore not occurred to those versed in the art, as is witnessed by the elaborate provisions heretofore made for reading. See, for example, the elaborate arrangement of conductors 16, 17 in U.S. Patent 2,988,668 to Lincoln et al.

Referring now to FIG. 3, there is shown a combination of electron gun and screen structure suitable for use in practicing the invention. The gun comprises a conventional cathode (brought out to lead 23), modulator grid (No. 1) 24, heater 25, anode 26, focusing anode 27, and schematically-shown deflecting electrodes 28—all productive of a beam 29 electrostatically positionable in two dimensions to scan the magnetic matrix. The reference numeral 30 designates the flat front of the bulbous portion of a cathode ray tube on which the collector anode 31 is mounted or deposited. Imposed on the collector anode 31 is a magnetic matrix comprising a thin magnetic film or finely dispersed coating of ferrite or molybdenum alloy powder 32. Superimposed on this film is a very thin film 33 of transparent carbon.

When an electron beam is swept over the magnetic matrix, after the fashion of scanning in television receiver picture tubes, particles impacted by the beam at the times that the beam is pulsed are caused to saturate. That is to say, any discrete portion of the matrix which is being scanned and is in registry with the electron beam at the time that the modulating grid is gated to pulse the beam will be magnetized, and the remanence characteristic of magnetic materials accomplishes the storage of a data bit in each particle so magnetized.

Figure 5:
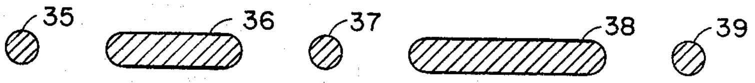
FIG. 5 illustrates typical magnetized spots on the screen caused by the writing of a word on a line.

Referring now specifically to FIG. 5, there is shown a word comprising five magnetized "dot-dash" type data bits or spots on the magnetic matrix of the screen. It will be understood that the matrix provides a large number of lines and adequate space, on each line, for a substantial number of words.

Figure 6:
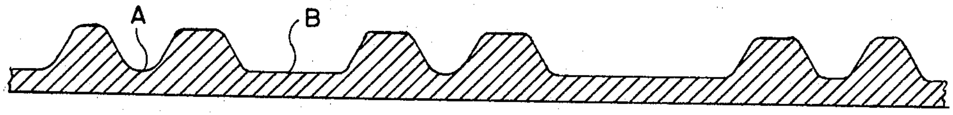
FIG. 6 is a graph of voltage amplitude versus time, showing a typical word as read out in terms of output voltage.
Figure 8:
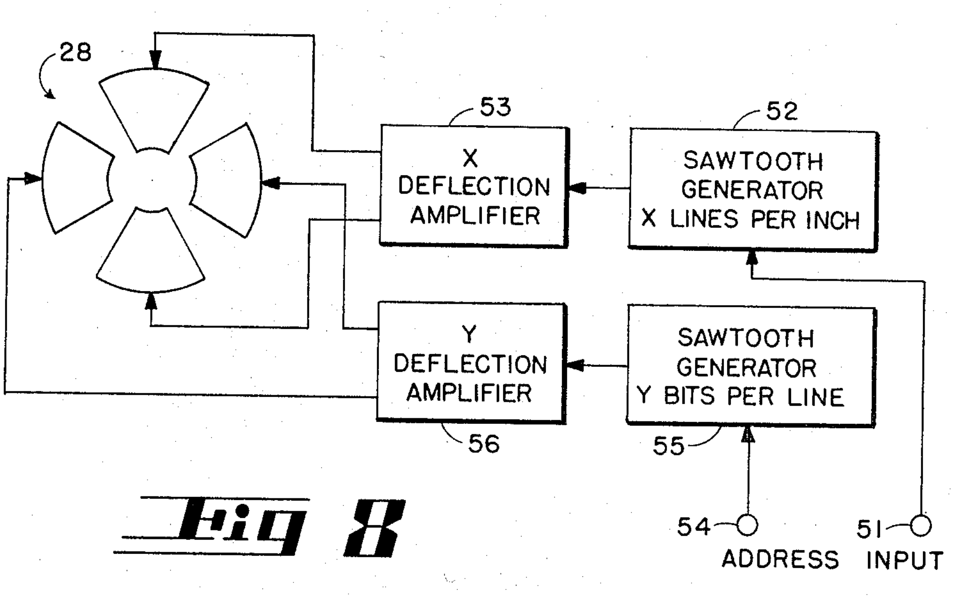
FIG. 8 is a block diagram of suitable circuitry for the random access read-out.

The data bits mentioned above are identified by the reference numerals 35, 36, 37, 38, and 39 (FIG. 5). In the description of the read-out operation of the embodiment referred to in FIGS. 3–7, destructive read-out is postulated. When the electron gun arrangement is employed, after the manner of a television camera tube, and when the electron beam is of adequate intensity, the magnetic data on the screen are converted into voltage difference between the carbon film 33 and the collector anode 31. That is to say, the magnetic energy in the magnetized spots is in effect converted into an electric current which appears in an anode load resistor and can be measured. This voltage is illustrated in FIG. 6, the amplitude and duration of the wave shape A being indicative of a small spot 35, and the amplitude and duration of the wave shape B being indicative of the spot 36, and so forth.

Figure 7:
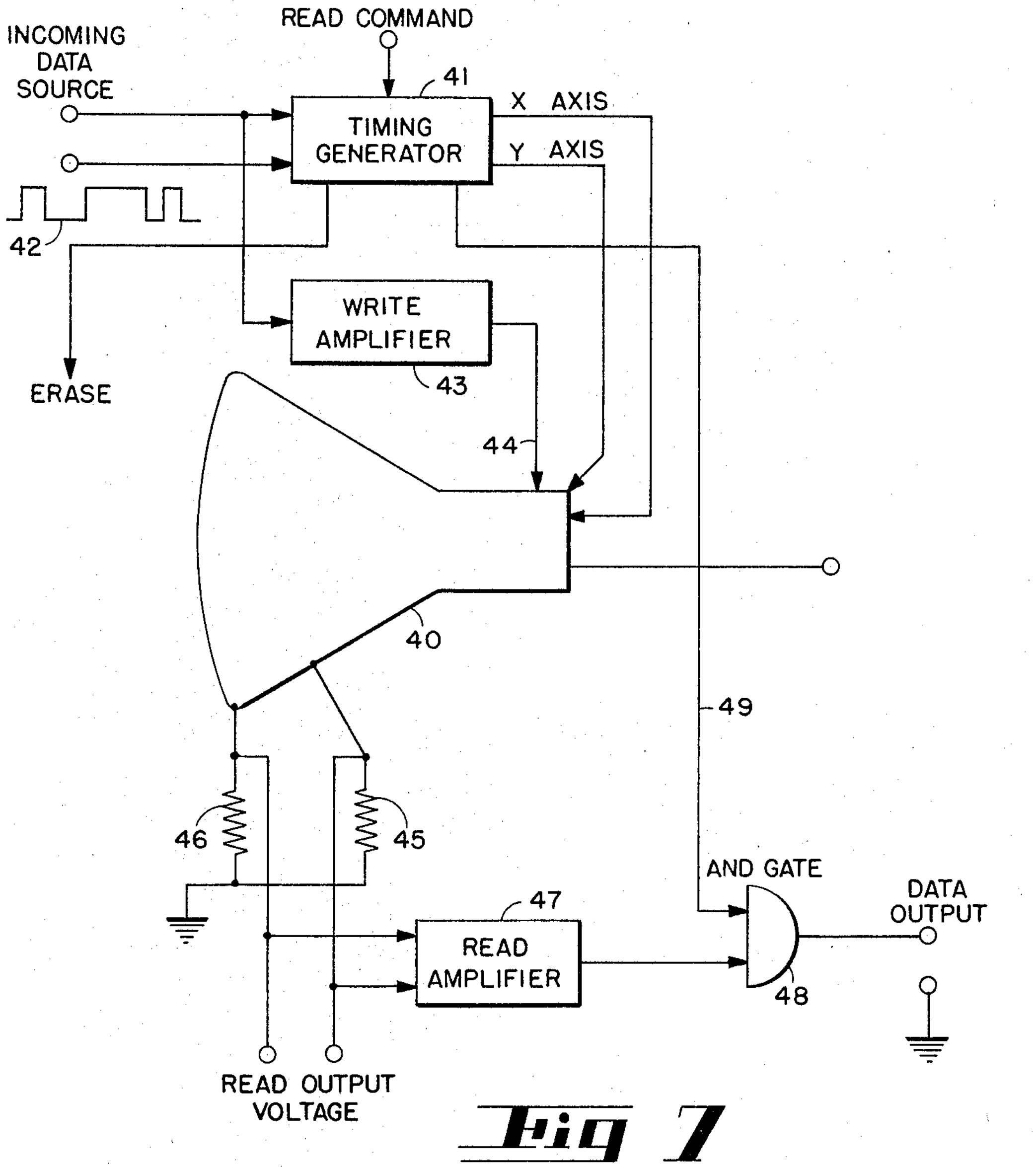
FIG. 7 is a schematic diagram of a system including the FIG. 3 embodiment, complete with block diagrams of suitable write and read circuits and associated timing and gating circuits.

Reference is now made to FIG. 7, wherein there is shown a storage tube 40 containing all of the elements of FIG. 3. A timing generator 41 includes sawtooth generators suitably coupled to deflecting circuits to synchronize the scanning action with incoming data—that is to say, as data are applied to the system the timing generator causes the beam to scan line 1, then line 2, and so forth, and the incoming data source is accordingly coupled to the input of the timing generator for this purpose.

The incoming wave form 42 is in boudot form, as shown, but the invention is not restricted to this particular code. For example, a change of magnetic polarity at a designated point may represent a logical 1, while a continuous or unchanging polarity may represent a logical 0. Alternatively, a magnetic polarity in one direction may represent a 1, while saturation in the opposite or reverse polarity may indicate a 0. A further code could correspond to the lineal length or distance between similarly magnetized areas, as in the Morse code, or the distance between areas of similar polarity, and so on. The writing operation is simply a matter of receiving incoming data, amplifying it in amplifier 43, and then applying the amplified data via line 44 to the modulator grid to pulse the write beam in accordance with the incoming data.

Referring now to the read operation of FIG. 7, the beam is energized and deflected for scansion. Anode load current appears in resistors 46 and 45 (connected to anode 31 and film 33, respectively) and is amplified in amplifier 47 and fed through "and" gate 48 to the data output of the system, the and gate also being provided with a blanking circuit input 49 for inhibiting output when the write beam is switched off or is retracing.

If rapid access reading is desired, as for example to read the state of a specific magnetic element on any specific line, then input information indicative of the desired line and bit is provided in analog form. In the event that such information is available only in digital form, it is transformed to analog form by well-known digital techniques. Analog information for selection of the desired line is applied through an address input 51 to a sawtooth generator 52 which, being coupled to the vertical deflection plates through amplifier 53, appropriately displaces or deflects the read beam to select the desired line. Similarly, bit-selection analog information applied to the Y address input 54 controls sawtooth generator 55 which, being coupled to the horizontal deflecting electrodes via deflection amplifier 56, displaces the electron beam to select the desired bit, whereupon the beam senses the state of the selected magnetic core or bistable element and read-out is accomplished as per the description of FIG. 7. Erasure is accomplished by conventional beam defocusing techniques.

While there have been shown and described what are at present considered to be the preferred embodiments of the invention, it will be understood by those skilled in the art that various modifications and changes may be made therein without departing from the scope of the invention as defined in the appended claims.

Having disclosed my invention, I claim:

1. A high speed memory device comprising, in combination:

an evacuated envelope, a magnetic matrix comprising a cylindrical configuration of ferrite rods disposed within said envelope, said ferrite rods being discrete saturable elements, A single electron beam-providing means disposed within said envelope, said beam providing means comprising a cathode centrally positioned in said configuration and a concentric anode surrounding the matrix, means comprising a modulating grid surrounding said cathode for modulating an electron beam and positionally relating it to said saturable elements to write onto the matrix, and means for demodulating and oppositely positionally relating the beam to said saturable elements to read out of the matrix by beam-sensing of the magnetic states of said elements.

2. A memory device in accordance with claim 1 and including a concentric perforated grid between said modulating grid and said ferrite rods.

3. A high speed memory device comprising, in combination:

an evacuated envelope;

a magnetic matrix comprising a plurality of bistable elements disposed within said envelope;

means including deflecting means and electron beam producing means for scanning said matrix with an electron beam;

means for pulse-modulating the electron beam as it is deflected to scan the matrix for writing;

the current level of the beam and the degree of modulation being so controlled for writing that selected ones of said bistable elements change state in response to modulations as they are scanned;

and means for nondestructive reading out of the matrix comprising means for translating into intelligence the variations in the electron beam as the beam is deflected to scan the matrix to read and to sense the states of the bistable elements, the beam being unmodulated and controlled at such a low current level for reading that the states of the bistable elements are not changed.

References Cited by the Examiner

UNITED STATES PATENTS

| | | | |
|---|---|---|---|
| 2,988,668 | 6/1961 | Lincoln et al. | 315—13 |
| 3,145,267 | 8/1964 | Pajes | 179—100.2 |

JAMES W. MOFFITT, *Acting Primary Examiner.*

G. LIEBERSTEIN. *Assistant Examiner.*